United States Patent
Paillard et al.

(10) Patent No.: US 12,006,254 B2
(45) Date of Patent: Jun. 11, 2024

(54) DEVICE AND METHOD FOR CONTROLLING THE SPRAYING OF A BONDING COMPOSITION IN AN INSTALLATION FOR MANUFACTURING MINERAL WOOL

(71) Applicant: SAINT-GOBAIN ISOVER, Courbevoie (FR)

(72) Inventors: Guillaume Paillard, Clermont (FR); Fatma Bedouhene, Saint Brice sous Forêt (FR); Patrick Kowalewski, Beauvais (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 861 days.

(21) Appl. No.: 16/897,875

(22) Filed: Jun. 10, 2020

(65) Prior Publication Data

US 2020/0392039 A1    Dec. 17, 2020

(30) Foreign Application Priority Data

Jun. 11, 2019    (FR) ...................................... 1906169

(51) Int. Cl.
*C03C 25/14* (2018.01)
*C03C 13/06* (2006.01)

(52) U.S. Cl.
CPC .............. *C03C 25/14* (2013.01); *C03C 13/06* (2013.01); *C03C 2213/00* (2013.01)

(58) Field of Classification Search
CPC .............................. C03C 25/14; C03C 25/143
See application file for complete search history.

(56) References Cited

U.S. PATENT DOCUMENTS

2005/0011281 A1    1/2005   Wulteputte
2009/0145168 A1*   6/2009   Orita ................. C03B 37/02718
                                                  65/488

(Continued)

FOREIGN PATENT DOCUMENTS

EP    1 491 261 A1    12/2004
FR    3 069 464 A1    2/2019

(Continued)

OTHER PUBLICATIONS

Search Report as issued in French Patent Application No. 1906169, dated Feb. 27, 2020.

*Primary Examiner* — Cynthia Szewczyk
(74) *Attorney, Agent, or Firm* — Pillsbury Winthrop Shaw Pittman LLP (57) ABSTRACT

A device for controlling a system for spraying a bonding composition onto mineral fibers, includes a ring, inside which the mineral fibers pass, a spray nozzle arranged on the ring and for spraying the composition onto the fibers, a first apparatus for measuring a flow of a fluid relative to the sprayed composition and a second apparatus for measuring a pressure of a fluid relative to the sprayed composition. A module compares a pair formed by a value, measured by the first apparatus, of the fluid flow and a value, measured by the second apparatus, of the fluid pressure, with a pair formed by a first previously defined reference value of a considered fluid flow, and by a second previously defined reference value of the considered fluid pressure. A pump feeds the fluid into the device so that a value of the flow of the fluid is constant.

11 Claims, 7 Drawing Sheets

(56) References Cited

U.S. PATENT DOCUMENTS

2009/0217710 A1* 9/2009 Costello, III ....... C03B 37/0253
356/73.1
2012/0144868 A1* 6/2012 Mirth .................... D04H 1/655
65/484

FOREIGN PATENT DOCUMENTS

| JP | S61-249562 A | 11/1986 |
| JP | H04-224065 A | 8/1992 |

* cited by examiner

DEVICE AND METHOD FOR CONTROLLING THE SPRAYING OF A BONDING COMPOSITION IN AN INSTALLATION FOR MANUFACTURING MINERAL WOOL

CROSS REFERENCE TO RELATED APPLICATIONS

This application claims priority to French Patent Application No. 1906169, filed Jun. 11, 2019, the entire content of which is incorporated herein by reference in its entirety.

FIELD

The invention relates to the field of manufacturing mineral wool, for example, of the glass wool type, and it more specifically relates to the devices and methods for spraying a bonding composition between and/or onto the mineral fibers used to manufacture such wools.

BACKGROUND

In installations for manufacturing mineral wool, the mineral fibers, for example, glass fibers, are formed in a fiber drawing station, from which they drop toward a conveyor, for example, under the effect of a descending air flow. As they transition toward this conveyor, a bonding composition is sprayed onto these fibers. This bonding composition helps to give the finished mineral wool its cohesion and its properties, for example, its mechanical and/or thermal and/or sound properties. The bonding composition comprises, for example, a spray and a binder formed by a resin, a fluid, such as water, used as a diluent, and additives, if necessary. This binder is intended to be combined with the spray, for example, compressed air, in order to spray the binder onto the fibers in the form of droplets in order to facilitate the flow of the binder between and/or on the fibers.

The bonded mineral fibers drop onto the aforementioned conveyor and the mat that is thus formed is subsequently directed toward an oven, in which the binder of the bonding composition is polymerized. A continuous mat of mineral wool is thus formed, which is a continuous mat that subsequently can be cut in order to form panels or rolls of thermal and/or acoustic insulation.

The binder is sprayed by a spraying system comprising, for example, at least one ring, inside which the mineral fibers successively pass, with such a ring being equipped with a plurality of spray nozzles distributed around the zone of passage of the mineral fibers. According to one embodiment, such a spraying system can comprise a first ring configured to route the binder and a second ring configured to separately route a compressed air flow, the air flow and the binder flow being mixed, for example, in the spray nozzles arranged between the rings to allow the binder to be sprayed onto the fibers upon exiting the nozzle(s).

It is easy to understand, for example, that the partial or complete blockage of one or more spray nozzles, causing a modification to the flow conditions of the bonding composition through these nozzles, can lead to an unwanted variation of the properties, for example, the mechanical and/or thermal and/or acoustic properties, of the finished mineral wool or to a variation in the homogeneity thereof, which can be detrimental to the quality of the finished product. In particular, a blockage of nozzles can result in the absence of bonding composition on a portion of the mineral fibers passing through the annular rings and therefore can result in heterogeneity in the distribution of the binder present in this bonding composition.

Within this context, seeking reliable means for identifying nozzle blockages is known. The use of pressure gauge control means is known, which means are configured to allow the air flow circulating in the corresponding ring to be verified. However, in a configuration as previously described, where the ring spraying device is equipped with a plurality of nozzles, the excess pressure of the air generated locally in the vicinity of a blocked nozzle is compensated by higher pressure spraying in the neighboring nozzles, with the air pressure value that is thus raised upstream of the ring being able to remain substantially the same despite this case involving the blockage of a nozzle.

SUMMARY

An aspect of the present invention is to propose a solution allowing precise detection of the complete or partial blockage of one or more spray nozzles, as well as, more generally, a modification of the flow of the bonding composition through the nozzles of the spraying device, for example, under the effect of the complete or partial blockage of one or more of these spray nozzles.

To this end, the subject matter of the invention, according to a first aspect, is a device for controlling a system for spraying a bonding composition onto mineral fibers, the spraying system comprising at least one ring, inside which the mineral fibers are intended to pass, and at least one spray nozzle configured to spray the bonding composition onto the mineral fibers, wherein the device comprises at least one first apparatus configured to measure a flow of a fluid relative to the sprayed bonding composition and a second apparatus configured to measure a pressure of a fluid relative to the sprayed bonding composition, wherein the device comprises a module configured to compare at least one pair formed by the value, measured by the first apparatus, of the fluid flow and the value, measured by the second apparatus, of the fluid pressure, with at least one pair formed by a first previously defined reference value of the considered fluid flow, and by a second previously defined reference value of the considered fluid pressure, and wherein the spraying system comprises at least a pump for feeding the fluid which is controlled into the device, so that a value of the flow of the fluid is constant.

As previously mentioned, the bonding composition beneficially comprises at least two components: a binder that is intended to be polymerized, and a component, hereafter denoted spray, allowing this binder to be sprayed through the one or more spray nozzles of the spraying system. The binder and the spray are fluids that cooperate in order to allow the bonding composition to be sprayed onto the mineral fibers. According to one embodiment, the spray used for spraying is compressed air. The spray and the binder, routed via a distribution circuit toward the one or more spray nozzles, particularly can be mixed within the one or more spray nozzles. Hereafter, the previously defined spraying system will be considered to comprise a plurality of spray nozzles distributed over the one or more rings, inside which the mineral fibers pass whilst receiving the sprayed bonding composition.

It is to be noted that the number of nozzles and their separation from one another depends on the shape, for example, annular, and the size of the ring, as well as on the type of nozzles used on this ring. The invention allows detection of the blockage of one or more nozzles irrespective of their design, with the warning thresholds being able to vary, particularly as a function of the number of nozzles present and of the coverage of their jet on the composition.

Hereafter, normal spraying conditions denotes conditions in which the flow of the bonding composition through the spray nozzles is not disrupted, neither by nature nor by flow.

More specifically, in normal spraying conditions, the nature of the sprayed bonding composition, both in terms of the proportion of its constituent components and in terms of the flow, is not modified by the possible alteration of a flow cross-section through one or more spray nozzles.

In contrast to the normal spraying conditions, the term "altered" that is used hereafter will denote conditions for spraying the bonding composition in which the flow of the composition through the spray nozzles is modified following a modification of a flow cross-section through these nozzles.

The control device according to the invention comprises a first apparatus configured to measure a flow of a fluid of the bonding composition, and a second apparatus configured to measure a pressure of a fluid of the bonding composition. According to various embodiments, the considered flow can be a mass flow or a volume flow of the selected fluid.

According to a favored, but not exclusive, embodiment of the invention, the aforementioned first apparatus and second apparatus are configured to respectively measure a flow and a pressure of the same fluid of the bonding composition. According to one embodiment, a flow and a pressure of the binder, previously defined, of the bonding composition are respectively measured by the first apparatus and by the second apparatus. According to the invention, it is beneficial for the flow and the pressure of the binder to be controlled, since it involves, in the bonding composition as previously defined with the binder, on the one hand, and the spray, on the other hand, the incompressible fluid alone, i.e. the only fluid for which a reliable relationship between the flow and the pressure is observed.

It must be understood herein that, in the control device according to the invention, the first apparatus and the second apparatus simultaneously respectively measure the aforementioned flow and pressure. The pair together formed by these measured values therefore constitutes, at the instant at which the measurement is performed, a characterization, by two distinct physicochemical magnitudes, of the spray of the bonding composition and, in particular, of its flow through the ring and the spray nozzles.

According to the invention, the previously defined reference values of the fluid flow and pressure are obtained, according to different embodiments, by calibrating, or by modelling, or by a combination of these two methods, the spraying of the bonding composition. By way of non-limiting embodiments, different pairs of reference values of the considered flow and pressure can be established as a function of the type of spray nozzle that is used, and/or as a function of different proportions of the constituent elements of the bonding composition. In other words, the invention stipulates that the pairs of reference values of the considered flow and pressure originate from charts established for different spraying parameters of the bonding composition such as, for example, the type of spray nozzle (nature, shape and dimensions of the spray section, etc.) and/or the proportions, for example, of the binder and of the spray in the sprayed bonding composition. In particular, the charts can consider air/liquid proportions, i.e. proportions between the spray and the binder at a determined constant value. In other words, according to the invention it is possible to control the blockage of nozzles in a context of spraying a bonding composition, for which the proportion of its constituent fluids is known, in this case in a ratio between air and liquid. It will be appreciated that these values are provided by way of an example and charts can be produced by calibration, in particular, with other proportions of components in the bonding composition. Furthermore, for a given chart, the different reference values of one of the flow or pressure magnitudes can correspond, for example, to different speeds for reeling off mineral fibers inside the system for spraying the bonding composition.

The control device according to the invention also comprises a module configured to compare a pair of measured flow and pressure values with a pair of reference values of these values, obtained by the aforementioned charts. The aforementioned comparison can be performed on either one of the measured magnitudes, or on a combination, by absolute value, of the values of these magnitudes (for example, a ratio of the values of these magnitudes, by absolute value). In other words, according to different non-limiting embodiments, the measured flow and pressure are either respectively compared with the flow and pressure values of the pair of corresponding reference values, or even a ratio, by absolute value, of the measured values of the flow and of the pressure can be compared with a ratio, by absolute value, of the flow and pressure values of the pair of reference values.

The comparison of the pair of values by this module, or command unit, also can be performed by comparing, for a set flow and, respectively, pressure component, the corresponding pressure and, respectively, flow value in the pair of measured values with the corresponding pressure and, respectively, flow value in the pair of reference values. The command unit is thus used to check that, for a measured value, the other value of the pair of values is equivalent to the theoretically expected value with reference to the charts.

According to the invention, the flow of binder, and if necessary of spray, particularly can be considered to remain constant throughout the bonding operation, with, for example, a binder flow of the order of 1500 liters per hour, with the pumps allowing the binder to be pushed toward the ring and the spray nozzles being fed in order to allow this flow to be kept constant, even in the event of the modification of the flow cross-section in the ring or in either of the spray nozzles.

By virtue of such a comparison taking into account both the flow parameter and the fluid pressure parameter, and in particular the binder forming an incompressible fluid, the invention thus allows reliable detection of a modification of the flow of the bonding composition through one or more spray nozzles.

Alternatively, the aforementioned charts can be established when, with all other things being equal, one or more spray nozzles are partially or completely blocked, i.e., with reference to the above, for altered spraying conditions. For example, a chart could be produced for predefined proportions of binder and of spray in the bonding composition, and by considering that a predefined number of spray nozzles is totally blocked. This then allows reference values to be provided that correspond to a predefined case of alteration of the flow of the bonding composition through the spray nozzles, in which predefined case the considered alteration can cause, on the finished product, which is mineral wool, a significant loss of quality. The comparison that is made between a pair of measured values and a pair of reference values then allows, rather than detecting a difference with normal spraying conditions, the instant to be detected at which such a difference has unacceptable consequences on the quality of the finished product.

The invention can also have one or more of the following features, taken separately or in combination.

The control device according to the invention comprises a command unit configured to command the first apparatus and the second apparatus to respectively simultaneously measure a flow of a fluid of the bonding composition and a pressure of a fluid of the bonding composition in real time. Beneficially, such a command unit comprises the aforementioned comparison module. The result of the above is that, according to this feature of the invention, the measurements are performed "in real time", i.e. at time intervals that are short enough for any significant variation in either one of the measured magnitudes to be detected. It must be understood herein that "significant" means any variation that is greater than the uncertainty of the performed measurement.

The command unit is configured to generate a first warning signal as soon as a difference between a pair of measured values of fluid flow and pressure and a pair of reference values of fluid flow and pressure exceeds a first predefined warning threshold. Herein and throughout the remainder of the document, a "difference between a pair of measured values and a pair of reference values" is understood to be a difference between a measured value and a corresponding reference value, with the other value of the pair of values that is the same for the pair of measured values and for the pair of reference values. Beneficially, according to the invention, a fluid flow value is selected that is kept constant through suitable control of a fluid supply pump, and the measured pressure value and the reference pressure value are compared.

It also must be understood herein that, depending on whether the measured magnitudes increase or decrease over time, the notion of "exceeding" the first warning threshold will occur depending on whether the one or more considered magnitudes rises above or falls below the first aforementioned warning threshold. In the aforementioned non-limiting embodiment, with a flow that is kept constant at a predefined value, the first aforementioned threshold can be a predefined value, or a predefined percentage change, of the measured pressure. According to one embodiment, the first aforementioned warning threshold corresponds to the values assumed by either one of the measured magnitudes when a first previously defined blockage level is reached for one or more spray nozzles. According to one embodiment, the first aforementioned warning signal can assume the form of an audible and/or a light signal emitted, for example, in a station for controlling the system for spraying the bonding composition, or it can assume the form of a command to shutdown the method for spraying the bonding composition in order to avoid a significant loss of quality of the finished mineral wool.

The type of signal particularly can be selected as a function of the configuration of the nozzles of the spraying device. In particular, if the number of nozzles is limited and they are therefore spaced apart from each other so that the jets of neighboring nozzles do not overlap, it is important that if a first warning level is exceeded it immediately involves shutting down the installation to check for the possible blockage of a nozzle and to prevent an entire part of the web of fibers passing through the ring from being impregnated with the bonding composition. Alternatively, if there is a sufficient number of nozzles to allow the jets of neighboring nozzles to overlap, exceeding a first warning level can involve only a warning to the operator, so that they are aware of the possible exceeding of a second threshold, which could potentially reveal the blockage of two neighboring nozzles, which this time could involve an entire part of the web of fibers passing through the ring not being impregnated with the bonding composition.

The previously defined command unit is configured to generate a second warning signal as soon as a difference between a pair of measured fluid flow and pressure values and a pair of reference fluid flow and pressure values is greater than a second previously defined warning threshold. According to various embodiments, the second warning signal can assume the form of an audible and/or a light signal emitted in a control station, or it can assume the form of a command to shutdown the method for spraying the bonding composition in order to prevent a significant loss of quality of the finished mineral wool.

The control device according to the invention is configured so as to generate a retroaction step, the content of which depends on the triggering of the first or of the second warning signal. In other words, a first action can be undertaken, automatically or manually, when the first warning threshold is exceeded and a first warning signal is generated, and a second action can be undertaken, automatically or manually, when the second warning threshold is exceeded and a second warning signal is generated.

By way of non-limiting embodiments, a first action can involve passing a high-pressure water jet over each of the nozzles, either by an operator, or automatically using suitable tooling. In addition, a second action can involve changing the ring in order to clean or to replace the ring whilst manufacturing continues with the replacement ring. This distinction that is made between the warning levels can allow a first action to be scheduled on the ring without shutting down the manufacturing line, with the implementation of the second action, in particular if the first action has no notable effect, involving shutting down manufacturing. It is also possible to provide a dual ring device, with an operational ring and a supplementary ring, which is only implemented when the operational ring has to be replaced after the second warning signal is triggered.

According to one feature of the invention, the first apparatus is configured to measure a flow of a binder forming an incompressible fluid of the sprayed bonding composition and the second apparatus is configured to measure a pressure of this binder.

According to an alternative feature of the invention, the spraying system comprises means for maintaining a constant ratio between the fluids forming the bonding composition and one of the apparatus is configured to measure a value of the flow, respectively of the pressure, of the binder forming an incompressible fluid of the sprayed bonding composition, whilst the other apparatus is configured to measure a value of the pressure, respectively of the flow, of air forming a second fluid of the bonding composition.

According to the first aspect as described above, the invention effectively achieves its stated aim by providing a solution allowing the precise detection, using simple means, of any modification of the flow of the bonding composition through one or more spray nozzles, for example, in the event of the partial or complete blockage of one or more of these spray nozzles.

According to a second aspect, the invention extends to a method for controlling the spraying quality of a bonding composition sprayed onto mineral fibers, comprising at least:
  a step of defining a plurality of pairs of reference values, respectively of a flow of a fluid of the bonding composition and of a pressure of a fluid of the bonding composition;

a step of simultaneously measuring, respectively by a first apparatus and by a second apparatus of a control device as previously described, a value of a flow of a fluid of the bonding composition and a value of a pressure of a fluid of the bonding composition;

a step of comparing the pair formed by the measured fluid flow and pressure values with at least one pair of reference fluid flow and pressure values.

The various pairs of reference values are, as previously stated, obtained by charts that are produced, for example, by previously calibrating and/or by modelling the spraying of the bonding composition onto the mineral fibers. The first step of the method according to the invention therefore involves establishing such charts, by calibrating the system for spraying the bonding composition and/or by modelling this spraying for different operational parameters.

According to different embodiments, the operational parameters that are selected to establish the aforementioned charts can comprise, in a non-exhaustive manner: a proportion of binder and of spray in the bonding composition, a predefined shape and dimensions of spray nozzles. According to one embodiment, such a chart can indicate the evolution of the pressure of the binder of the bonding composition as a function of the flow thereof, for a predefined value of the percentage of binder and of spray in this bonding composition, under normal spraying conditions, as previously defined. By way of an example, for a predefined speed of passage of the mineral fibers in such a ring and for a predefined proportion of binder and of spray in the sprayed bonding composition, a single pair of pressure and flow values of the binder is then obtained, forming a pair of reference values for these operational parameters. Alternatively, the selected pair of reference values can be a pair obtained for altered spraying conditions, for example, when one or more spray nozzles are partially or completely blocked, and when such a blockage causes, on the finished product, which is mineral wool, a significant loss of quality.

According to various features of the method according to the invention, taken separately or in combination:

during the comparison step a reference value identical to a value measured in the measuring step is identified from among charts consolidating the pairs of reference values and the other value of the pair of reference values is compared to the other value of the pair of measured values, with a warning step being generated in the event of a significant difference between the other compared measured value and the other compared reference value;

the method comprises an additional step of generating a second warning signal as soon as a difference between a pair of measured flow and pressure values and a pair of reference values is greater than a second previously defined warning threshold. According to various embodiments, this second warning signal can assume the form of an audible and/or a light signal emitted in a control station of the system for spraying the bonding composition, or even can assume the form of a computer signal on a monitor for controlling the mineral wool manufacturing installation, or it can assume the form of a signal for commanding the shutdown of the method for spraying the bonding composition onto the mineral fibers;

the method comprises a retroaction step, during which an action for treating the state of the ring is manually or automatically implemented following the triggering of either of the warning signals.

Both according to its first and its second aspect, the invention allows, through the implementation of simple means, effective and precise monitoring of the flow conditions of a bonding composition intended to be sprayed onto mineral fibers through nozzles of a spraying system. The invention thus allows, for reduced costs, the quality of the finished product to be improved, which product is mineral wool that is obtained after crosslinking the bonding composition around the aforementioned mineral fibers.

An aspect of the invention also relates to a manufacturing installation, in particular for mineral wool, comprising fiber drawing means configured to feed fibers inside a station for bonding these fibers, wherein the bonding station comprises a control device according to the aforementioned description.

BRIEF DESCRIPTION OF THE DRAWINGS

Further features, details and advantages of the invention will become more clearly apparent from the following description and drawings, in which.

DETAILED DESCRIPTION

Firstly, it is to be noted that if the figures disclose the invention in a detailed manner in order for it to be implemented, they certainly can be used to better define the invention if necessary. It is also to be noted that, throughout all the figures, elements that are similar and/or fulfil the same function are indicated using the same reference sign.

The invention relates to the implementation of a device for controlling the spraying of a bonding composition and, more specifically, for controlling the blockage of specific spray nozzles for spraying such a bonding composition, or binder, in particular onto a torus of fibers and in particular of mineral fibers.

Figure 1:
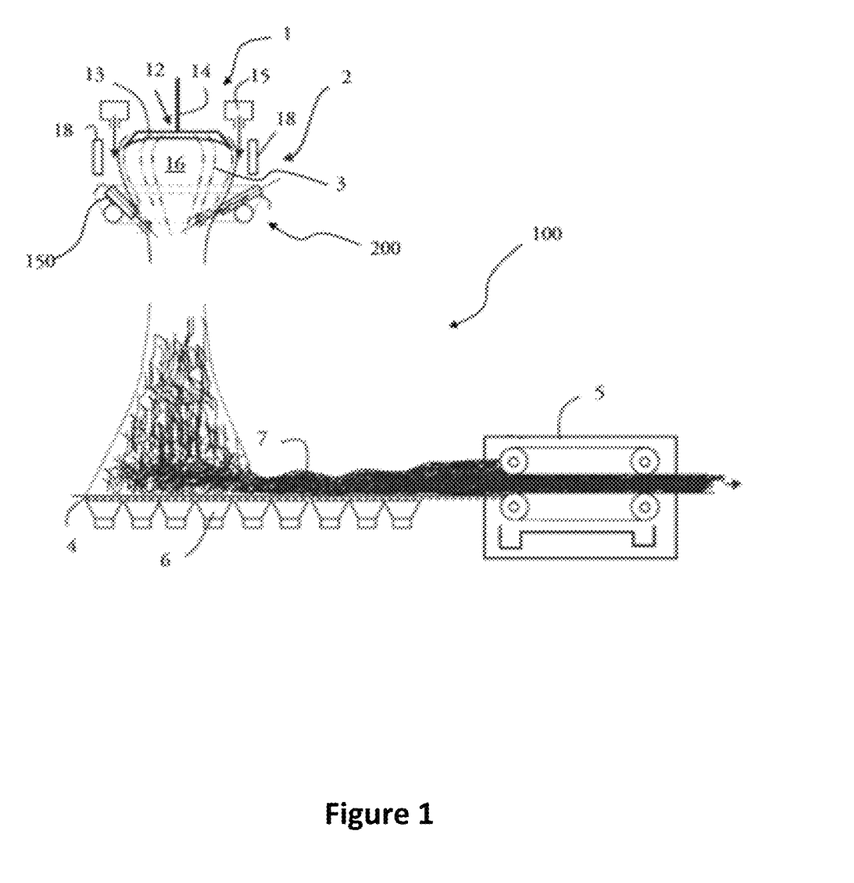
FIG. 1 is a schematic representation of part of a manufacturing installation according to the invention, particularly showing a bonding station, in which a control device according to the invention is installed.

FIG. 1 shows part of an installation 100 for manufacturing mineral wool, and more specifically glass wool, and more specifically different successive stations assisting in the creation of an insulating mat made up of bonded glass fibers forming an insulating material of the mineral wool type, for example, glass wool. A first station, called fiber drawing station 1, involves obtaining fibers by means of a centrifugation plate, downstream of which a second station is located, called bonding station 2, in which the bonding of the previously obtained fibers 300 is mainly obtained using a binder for binding them together.

The bonded fibers are placed in a forming station on a conveyor belt 4, which conveys them to an oven forming a crosslinking station 5 and inside which they are heated in order to crosslink the binder.

The conveyor belt 4 is gas and water permeable and it extends above suction chambers 6 for sucking in gases such as air, smoke and the excess aqueous compositions originating from the aforementioned fiber drawing process. A mat 7 of glass wool fibers thoroughly mixed with the bonding composition is thus formed on the conveyor belt 4. The mat 7 is conveyed by the conveyor belt 4 to the oven forming the station 5 for crosslinking the binder.

It is understood that such an installation line is adapted to produce glass wool fiber-based products, as will be described, but that it is obviously adapted to the production of mineral fiber-based products.

The fiber drawing station 1 in this case is configured to implement a method for fiber drawing by internal centrifugation. It will be understood that any type of centrifugation and associated centrifuge can be implemented with the following teaching once fibers are obtained at the output of the centrifuge for their future passage through the bonding station.

By way of an example shown in FIG. 1, the melted glass can be fed as a thread 14 from a melting furnace and initially recovered in a centrifuge 12, in order to subsequently be discharged in the form of a multitude of rotated filaments 3. The centrifuge 12 is also surrounded by an annular burner 15, which creates, on the periphery of the wall 13 of the centrifuge, a gaseous current at a high-speed and at a high enough temperature to draw the glass fiber filaments 3 in the form of a torus 16.

It is understood that the example of a fiber drawing station provided above is indicative and by no means limits the invention, and that a method equally could have been provided for fiber drawing by internal centrifugation with a basket and a perforated base wall, or with a plate with a solid base, as long as the melted glass is drawn by centrifugation in order to subsequently extend in the form of a torus of fibers 16 in the bonding station.

Furthermore, the fiber drawing station can comprise a heating system 18 used to keep the glass and the centrifuge at the correct temperature.

The torus of fibers 16 thus created is surrounded by a ring of a spraying device and is hereafter denoted as system for spraying a bonding composition 200, for which only two spray nozzles 150 equipping this ring are shown in FIG. 1.

Figure 2:
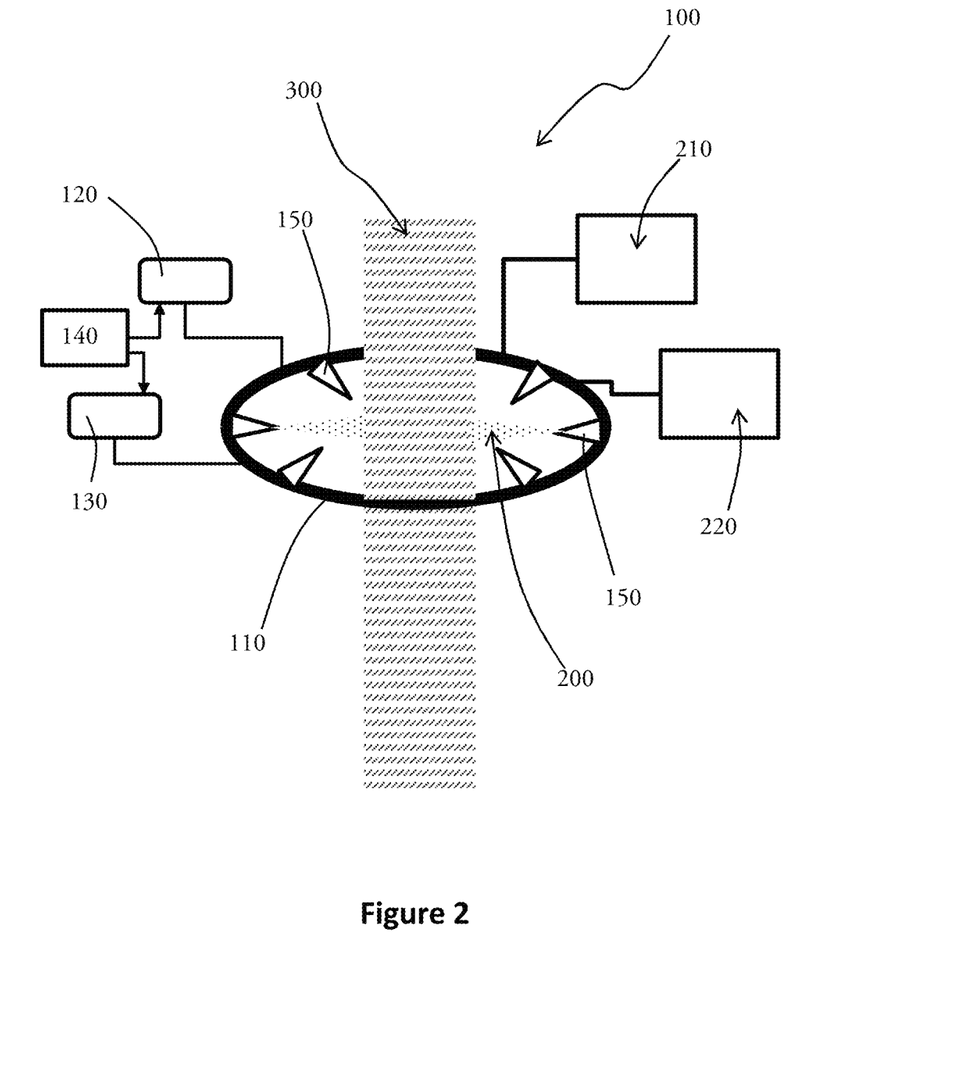
FIG. 2 schematically shows a control device according to the invention, the device for spraying a bonding composition being schematically shown in order to show a distribution of the spray nozzles.

With reference to FIG. 2, a system 100 for spraying a bonding composition 200 onto mineral fibers 300 intended to form, with the bonding composition 200, a mineral wool, not shown in FIG. 2, comprises at least one ring 110, in this case an annular ring, on which a plurality of spray nozzles 150 is distributed. According to one embodiment, the mineral fibers 300 are glass fibers.

By passing inside the ring 110, the mineral fibers 300 receive, sprayed by the spray nozzles 150, a bonding composition 200 made up of at least one binder 210 and one spray 220. Advantageously, the binder 210 is a polymerizable fluid, and the spray 220 is a fluid, for example, compressed air, allowing the binder 210 to be sprayed onto the mineral fibers 300.

It is understood from the schematic representation of FIG. 2 that the binder 210 and the spray 220 are routed toward the ring 110, in which they are mixed before being sprayed onto the mineral fibers 300 by the spray nozzles 150. The purpose of the spray is to convert the binder into droplets liable to penetrate the torus of fibers and the bonding composition, once mixed in the fibers, is basically only composed of the binder.

The homogeneity and/or the spraying quality of the bonding composition 200 sprayed onto the mineral fibers 300 can be affected by a modification of the flow of this bonding composition through one or more of the spray nozzles 150. In particular, for example, the partial or complete blockage of one or more spray nozzles 150 will substantially affect the quantity of the bonding composition 200 locally sprayed onto the mineral fibers 300 reeled off into the ring 110, which can cause a notable loss of quality of the finished mineral wool, once the bonding composition 200 is crosslinked in a crosslinking station, not shown in FIG. 2.

According to the invention, the spraying system 100 comprises a control device that comprises a first apparatus 120 and a second apparatus 130, respectively configured to measure a flow D of a fluid of the bonding composition 200 and a pressure P of a fluid of the bonding composition 200. In an embodiment, the first apparatus includes one or more flow sensors and the second apparatus includes one or more pressure sensors. In an embodiment, but not exclusively, the first apparatus 120 and the second apparatus 130 are configured to respectively measure a flow and a pressure of the same fluid of the bonding composition 200. Hereafter, the invention will be described and illustrated according to a non-limiting embodiment, in which the first apparatus 120 and the second apparatus 130 are configured to respectively measure a flow D and a pressure P of the binder 210 of the bonding composition 200.

The device for controlling the spraying system 100 also comprises a command unit 140 configured to command the simultaneous measurement, respectively by the first apparatus 120 and by the second apparatus 130, of a flow D of the binder 210 and of a pressure P of the binder 210. In an embodiment, the command unit 140 includes one or more electronic components that is/are adapted to carry out the commands, including for example, a calculation step, a comparison step, a control step. For example, in an embodiment, the command unit 140 includes a non-transitory memory encoded with machine executable instructions for carrying out the commands. The command unit 140 may also include a processor connected to the memory for executing the commands.

According to the embodiment that is more specifically shown in FIG. 2, the first apparatus 120 and the second apparatus 130 are configured to perform the aforementioned measurements within the ring 110, on which the spray nozzles 150 are distributed.

Figure 3:
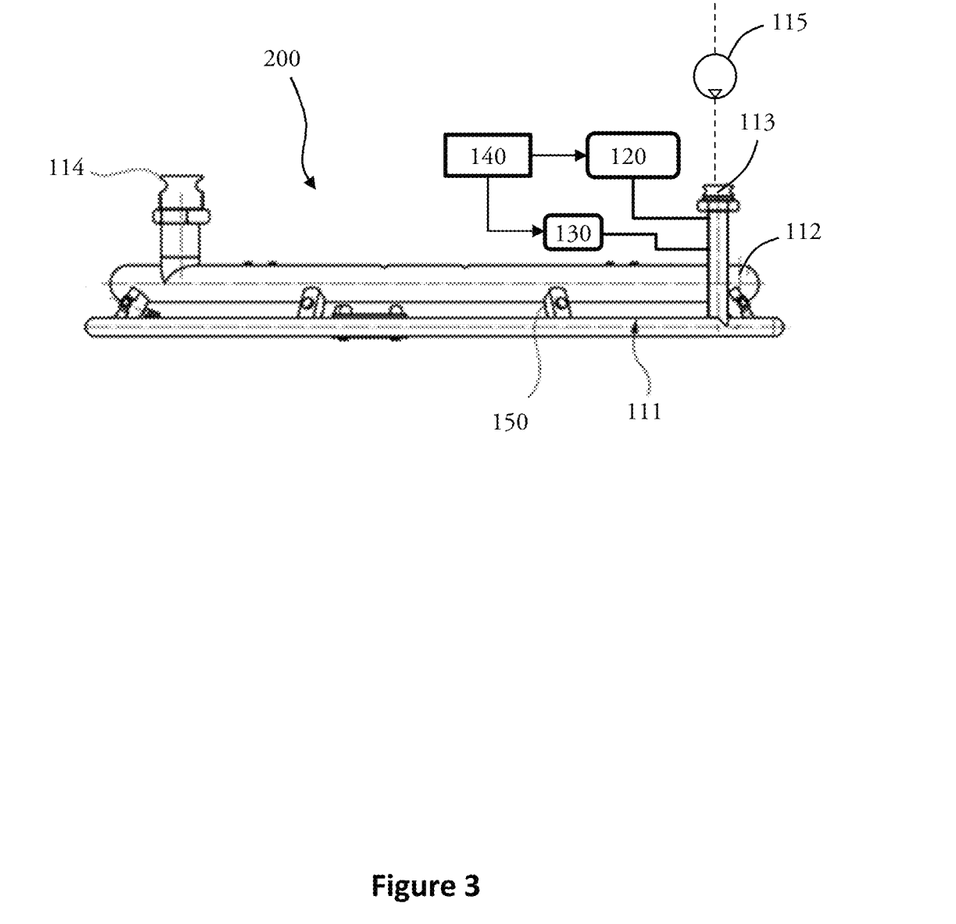
FIG. 3 schematically shows a control device according to the invention, the device for spraying a bonding composition being shown on the side to show an embodiment in which two annular rings are disposed one above the other in order to separately feed two fluids forming the bonding composition into each spray nozzle.

An embodiment of the ring 110 in the form of an annular ring is more specifically shown in FIG. 3, without this annular shape by any means limiting the invention.

In the illustrated example, the ring particularly comprises a first annular tube 111, inside which a first distribution duct is arranged to allow circulation of the binder 210, as well as a second annular tube 112, inside which a second distribution duct is arranged to allow circulation of compressed air, which is capable of spraying the binder onto the fibers via the spray nozzles.

Each annular tube 111, 112 has a tubular shape, the inner wall of which has a constant section, or substantially constant section, over the entire periphery of the tube. A substantially constant section is understood to be a section that remains the same with a separation margin that is below 5%.

The first annular tube 111 comprises a feed pipe 113 for the binder, connected at its other end to a tank 115 for this binder. The binder particularly can be made up of a binder with a low formaldehyde content, and in an embodiment even without formaldehyde, which can be referred to as a bio-sourced product-based binder, or "green binder". The measurement of the pressure and of the flow of the binder is performed in this feed pipe, upstream of the distribution duct formed in the first annular tube 111. It will be appreciated that other zones could be selected without departing from the scope of the invention in order to connect the first apparatus 120 and the second apparatus 130.

The first annular tube 111 also comprises a plurality of outlet orifices evenly distributed over the entire periphery of the first annular tube and each emerging at a spray nozzle 150 arranged to be in fluid communication with the distribution duct formed in the first annular tube 111 via the corresponding outlet orifice.

In the same way as the first annular tube, the second annular tube 112 comprises a feed port 114 for a compressed air intake. If necessary, measuring apparatus, in addition to those previously mentioned, can be connected to this feed port for measuring the pressure and the flow of the air present in the bonding composition that is to be sprayed.

It is understood that the second annular tube 112 delimiting the second distribution duct 26 also comprises a plurality of outlet orifices, with each of the spray nozzles being in fluid communication with the distribution duct formed in the second annular tube via these orifices.

Each spray nozzle comprises a body, which thus extends between the annular tubes of the ring, said nozzle being configured to allow the binder and air to be mixed and to spray a bonding composition in accordance with suitable air-to-binder proportions.

Figure 4:
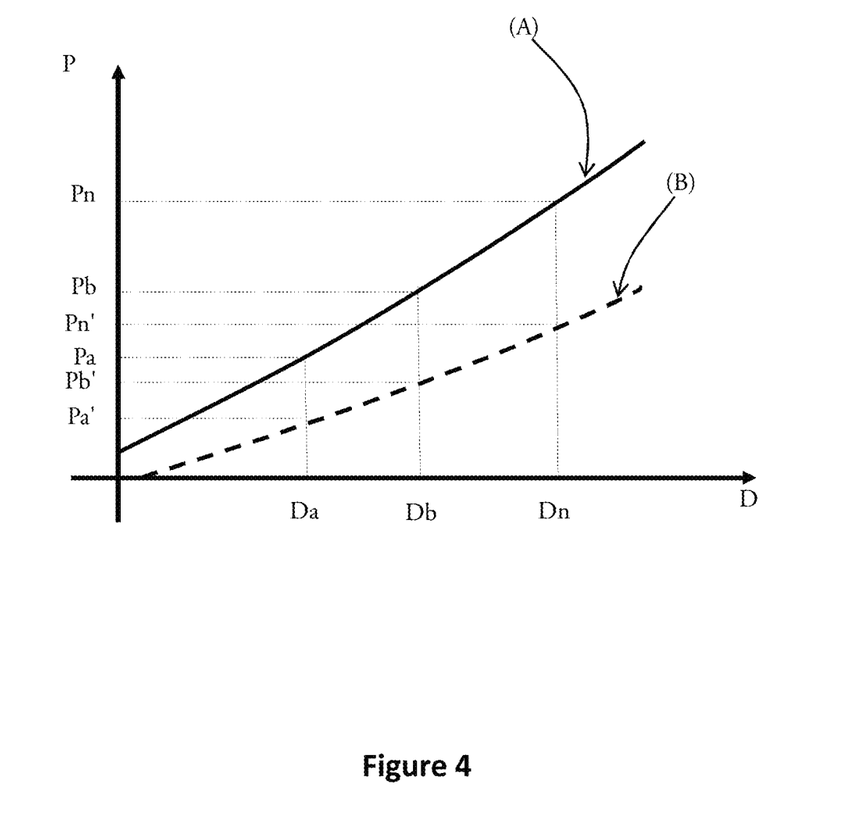
FIG. 4 schematically shows two charts allowing the control method according to the invention to be implemented.

FIG. 4 shows an example of the evolution of the pressure P of the binder 210 as a function of the flow D of said binder 210 for different operational parameters of the spraying system 100. In other words, FIG. 4 schematically shows two examples of charts as previously defined.

The solid line curve (A) in FIG. 4 thus illustrates, for example, the values assumed by the pressure P and the flow D of the binder 210 for a first set of values of operational parameters of the spraying system 100. According to one embodiment, the solid line curve (A) is established for a predefined type of spray nozzles, under normal spraying conditions as previously defined, and for first proportions of binder 210 and of spray 220 in the sprayed bonding composition 200, corresponding to a first set of properties of the finished mineral wool, for example, specific mechanical properties. Each value (Da, Db, . . . Dn) of the flow of binder 210 therefore corresponds, for this first set of values of the aforementioned operational parameters, to a single value (Pa, Pb . . . Pn) of the pressure of the binder 210.

Similarly, the broken line curve (B) in FIG. 4 shows, for example, the values assumed by the flow D and the pressure P of the binder 210 for a second set of values of the same operational parameters of the spraying system 100 as those defined to establish the solid line curve (A). According to one embodiment, the broken line curve (B) is established for a predefined type of spray nozzles, under normal spraying conditions, and for second proportions of binder 210 and of spray 220 in the sprayed bonding composition 200, corresponding to a second set of properties of the finished mineral wool, for example, specific acoustic properties. Each value (Da, Db, . . . Dn) of the flow of binder 210 therefore corresponds, for this second set of values of the operational parameters, to a single pressure value (Pa', Pb', . . . Pn') of the binder 210.

Therefore, it must be clearly understood herein that the curves shown in FIG. 4 show, for different values of one or more operational parameters of the spraying system 100, the evolution of the pressure P of the binder 210 as a function of operating conditions of the spraying system 100, i.e., for example, as a function of a speed for reeling off the mineral fibers 300 in the ring 110, independently of any modification of the local flow conditions of the bonding composition through the spray nozzles 150. In other words, the charts shown in FIG. 4 do not take into account a temporal evolution of the flow D and of the pressure P of the binder 210, for example, under the effect of progressive modifications of the flow conditions of this binder 210 in the ring 110 during the process of spraying the bonding composition 200.

Figure 5:
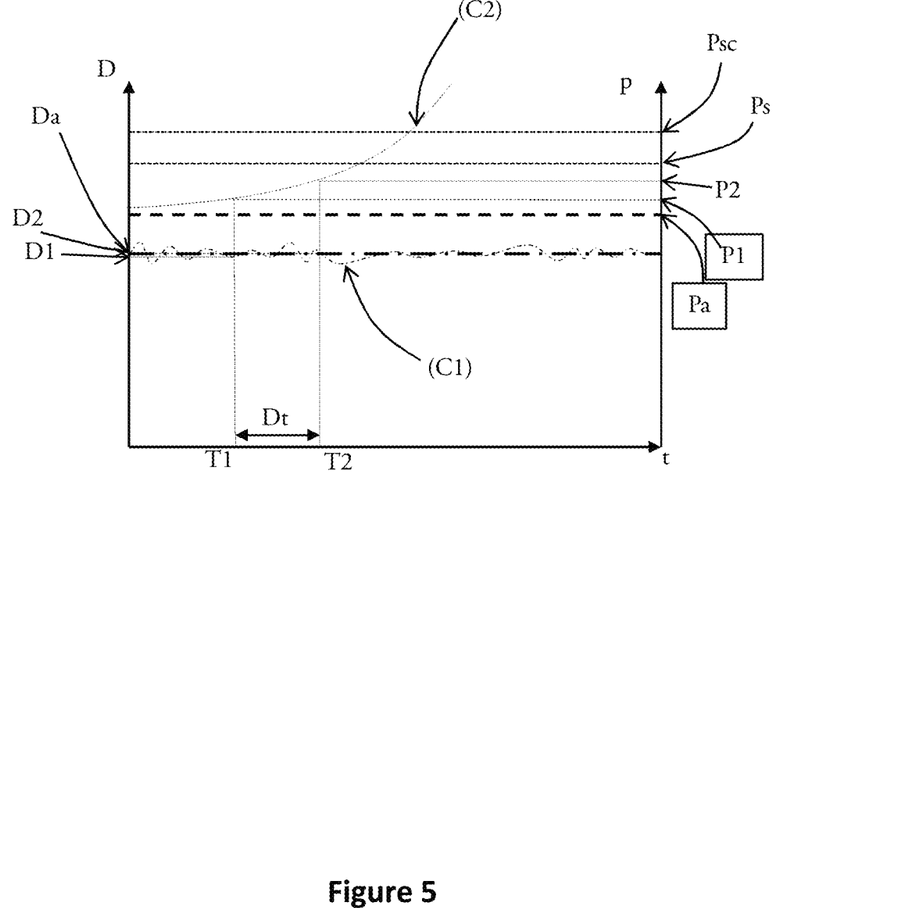
FIG. 5 schematically shows an embodiment of the method according to the invention.

FIG. 5 shows an example of the temporal evolution, during an operation of spraying the bonding composition 200 onto mineral fibers 300 reeled off inside the ring 110 and for a flow D of the binder 210 that is kept constant, of the pressure P of the binder 210, with the flow D and the pressure P being respectively measured by the first apparatus 120 and by the second apparatus 130.

In this figure, the thick mixed line curve (A1) represents the evolution, as a function of time t, of a first value Da of the flow of the binder 210, and the thick broken line curve (A2) represents the evolution, as a function of time t, of a first value Pa of the pressure of the binder 210. The aforementioned values Da, Pa are obtained from a chart such as, for example, that which is shown by the solid line curve (A) in FIG. 4. For example, the first value Pa of the pressure of the binder 210 is provided, by the chart (A) previously defined and shown in FIG. 4, on the basis of a first predefined value Da of the flow of the binder 210. The aforementioned value Da is, for example, representative of a predefined set of operating conditions of the spraying system 100, i.e. a predefined set of conditions for implementing, by the spraying system 100, operational parameters for which the chart (A) has been established. The pair formed by the aforementioned values (Da, Pa) thus forms a pair of reference values, representing both a predefined set of values of operational parameters of the spraying system 100 and a set of previously determined operating conditions of the spraying system 100.

The result of the above is that the reference values Da, Pa, respectively of the flow of the binder 210 and of the pressure thereof, which are theoretical values of the aforementioned flow and pressure for the selected operational parameters and operating conditions, are substantially constant over time.

In FIG. 5, the thin mixed line curve (C1) represents the temporal evolution of the flow D of the binder 210, measured by the first previously defined apparatus 120, and the broken line curve (C2) represents the temporal evolution of the pressure P of the binder 210, simultaneously measured by the second previously defined apparatus 130.

As previously indicated, the invention stipulates that the flow D and the pressure P are simultaneously measured, respectively by the first apparatus 120 and by the second apparatus 130. Moreover, as illustrated, the flow D of the binder in this case is kept constant, in particular by means of suitable control of a pump for feeding the binder into the device. By way of an example, the pump is controlled so that a constant flow of binder of the order of 1500 liters per hour is obtained. Some slight variations of the flow around the reference value Da have been shown in the figure and it will be understood that these variations are minimal in relation to the nominal value of the flow, so that this flow is estimated to be constant. The pump may be controlled by the command unit 140.

The flow and pressure measurements of the binder are performed in real time and FIG. 5 shows two of these measurements performed at a time interval Dt. At a first instant T1, a first measurement is performed of a first pair of values formed by a first value D1 of the flow of binder 210, that is substantially equal to the reference flow value Da, and a first value P1 of the pressure of the binder 210, and at a second instant T2, a second measurement is performed of a second pair of values formed by a second value D2 of the flow of binder 210, in this case equal to the reference flow value Da, and a second value P2 of the pressure of the binder 210.

According to the invention, the previously defined command unit 140 is configured to generate a first warning signal as soon as a difference between a pair of measured values (D1, P1) and a pair of reference values (Da, Pa) is above a first warning threshold. As previously described, the aforementioned difference can, according to one embodiment, be observed for one of the measured magnitudes, and more specifically the pressure P for a flow D that is kept constant. According to this embodiment, more specifically shown in FIG. 5, a first warning threshold Pthresh is defined for the pressure P of the binder 210.

As soon as the measured pressure magnitude of the binder exceeds the first warning threshold Pthresh, the invention stipulates that a first warning signal is generated. The first previously mentioned warning signal therefore will be emitted as soon as a measured value of the pressure P will be greater than the first warning threshold Pthresh. Such a first warning signal can, for example, assume the form of an audible and/or a visual signal emitted in a control station of the spraying system 100.

Hence, the benefit of the invention can be understood for the early detection of any alteration of the flow conditions of the bonding composition 200 through the previously defined spray nozzles 150. Indeed, for a flow D of the binder 210 that is kept constant, the corresponding pressure P is significantly affected by a modification of the flow conditions of the bonding composition 200 through the spray nozzles 150, and more specifically by a blockage in one or more nozzles. The inventors have particularly been able to demonstrate that the effect of a reduction in the flow cross-section on the pressure of the fluid flowing through this flow cross-section is much greater than the effect of enlarging the flow cross-section of the air opening of the nozzle, i.e. the slot through which the air and binder mixture forming the bonding composition flows. By way of an example, if the air opening of a nozzle is eroded and the slot through which the bonding composition is sprayed is thus enlarged, the resulting pressure reduction, at a constant flow of the binder, is limited and does not compensate the increase in pressure that would result from a blocked nozzle. In other words, the value of the pressure P of the binder 210 can be rapidly significantly affected by a partial or complete blockage of one or more spray nozzles 150, whereas this pressure value is only slightly affected by the enlargement of the flow cross-section of the air opening. Thus, according to the invention, the detection of a blockage of a nozzle is guaranteed even if the neighboring nozzles experience an alteration with an opposite effect.

Exceeding a warning threshold could indicate that one or more nozzles are completely blocked, or even that the set of nozzles is partially blocked. In each case, a corrective action can be implemented in order to return to conditions for spraying the bonding composition that are closer to the desired theoretical conditions. By performing a simultaneous measurement of the values of the flow D and of the pressure P of the binder 210 in real time, and by comparing this pair of values with a pair of reference values, the invention enables rapid detection of any modification of the flow conditions of the bonding composition 200 through the spray nozzles 150, irrespective of the cause.

By way of an example, the number of spray nozzles provided on the ring, in this case an annular ring, that is dedicated to spraying the bonding composition can equal seven or nine for a first type of nozzles and equal sixteen or twenty-four for a second type of nozzles.

As shown in FIG. 5, the invention also stipulates defining a second warning threshold. According to the embodiment shown in FIG. 5, the second warning threshold assumes the form of a second pair of values, respectively of the flow D and of the pressure P of the binder 210 of the bonding composition 200, more specifically corresponding to a critical threshold pressure value Psc above the previously described threshold value Ps and to a flow D that is kept constant. As soon as the measured pressure value P exceeds the second warning threshold Psc, a second warning signal is generated by the previously defined command unit 140. According to one embodiment, the second warning signal can assume the form of a simultaneous command to shutdown the reeling off of mineral fibers 300 in the ring 110 and to shutdown the spraying of the bonding composition 200 by the spray nozzles 150.

In the two embodiments shown herein, a comparison of the value measured for the flow and the pressure of a fluid, in this case the binder, is performed simultaneously and respectively with the corresponding reference value.

Figure 6:
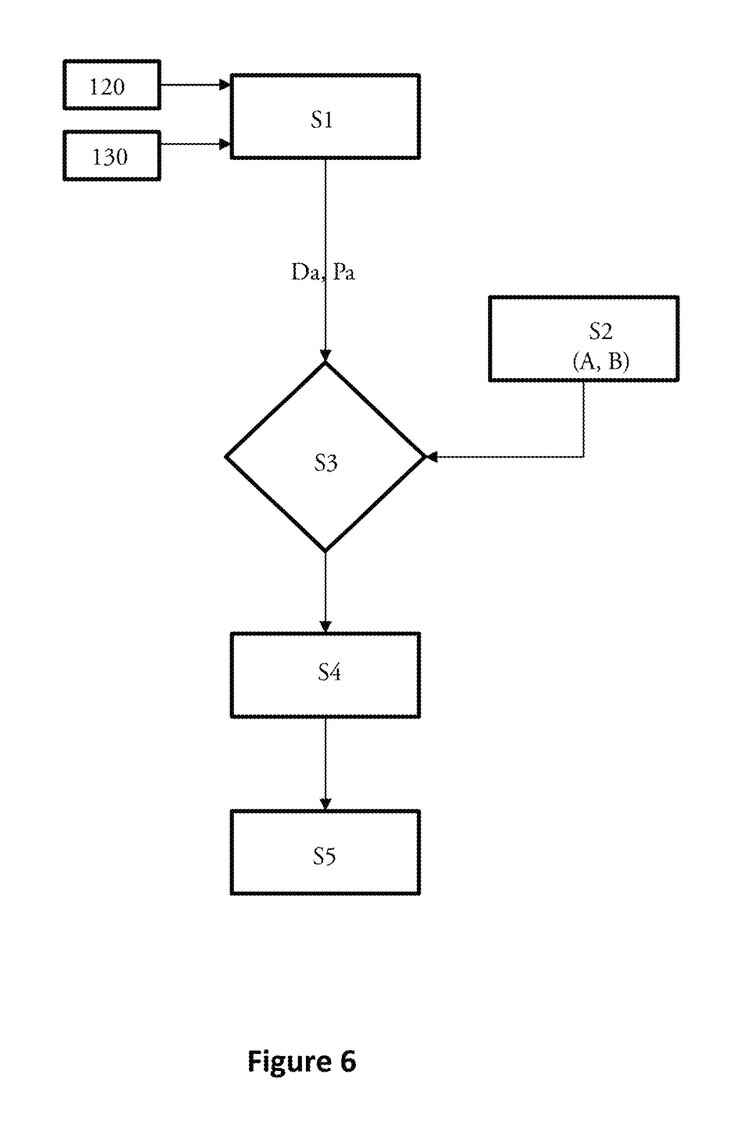
FIG. 6 is a logical diagram representation of the main steps of the control method according to the invention.
Figure 7:
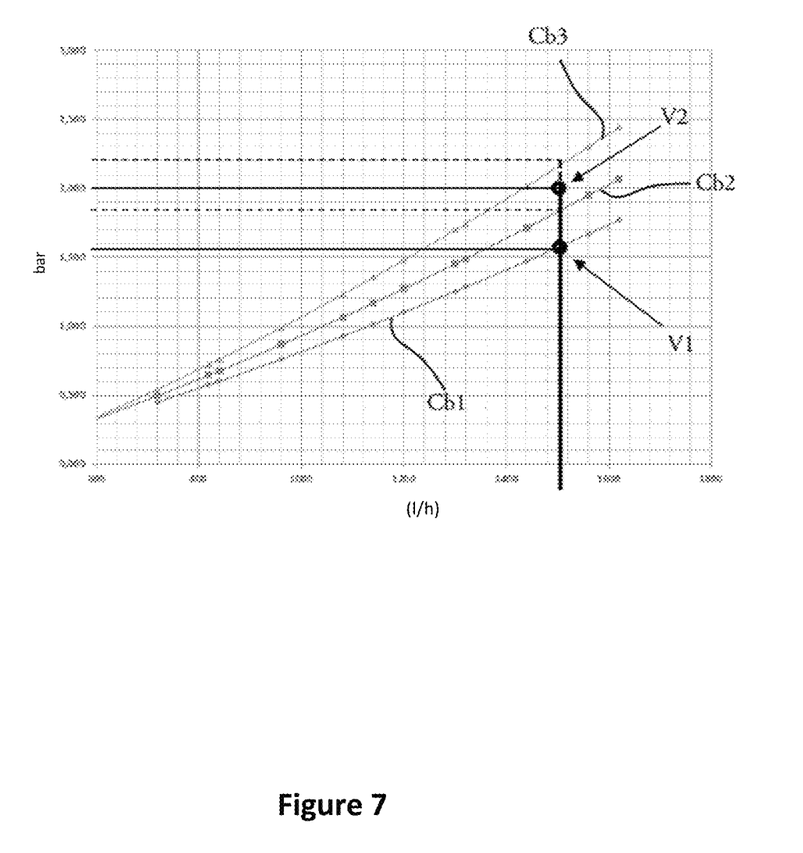
FIG. 7 schematically shows another embodiment of the method according to the invention.

Another embodiment is shown in FIGS. 6 and 7.

According to the aforementioned description, a pair of measured values D1, P1 is recovered at a given instant during a measuring step S1. This pair of values is associated with a previously established chart and is stored in a memory unit of the control device, with the chart (A, B) being selected during an association step S2, such as that corresponding to the predefined set of operational parameters of the spraying device used during the measurement. By way of an example, with the control method in this case being implemented for a ring equipped with six spray nozzles of a first given type and for determined spraying conditions, particularly with an air/liquid ratio in the bonding composition of the order of 0.25, the selected chart is the chart (A) established in these spraying conditions and with this type of ring.

Hereafter, the pressure value will be read in the pair of measured values as a function of the flow value, in accordance with the description provided until now with a flow that is kept constant by suitable control of the pump allowing the binder to be fed, with it being understood that the opposite could be the case without departing from the scope of the invention.

During a comparison step S3, the command unit 140 identifies, from the pair of measured values, the flow value, in this case, in the example as shown in FIG. 7, equal to 1500 l/h. The command unit identifies, in the selected chart, a corresponding reference pressure value and it compares the measured pressure value relative to this reference pressure value, for the set flow value. In the event of a significant difference between the measured pressure value and the reference pressure value, for a measured flow value, a warning step S4 is generated.

A retroaction step S5 is then generated following this warning step S4. As has been previously stated, this retroaction step involves treating the ring and in particular its spray nozzles in order to completely eliminate or reduce the blockage of the nozzle. For example, a step involving a jet of compressed air can be implemented automatically as soon as a warning is generated.

FIG. 7 shows a specific chart, which identifies three curves Cb1, Cb2 and Cb3 identifying pairs of reference pressure/flow values in the case in which, respectively, no nozzle is blocked, two nozzles are blocked and four nozzles are blocked. It is understood that the number of blocked nozzles in this case is provided by way of an example and that the purpose of this specific chart is to identify pairs of reference values in blocked nozzle situations.

The benefit of such a chart in the control method according to the invention is described hereafter as a function of two results of different measurements.

In a first case, during a first measuring step S1, a pair of values V1 is measured with a binder flow of the order of 1500 l/h and a binder pressure of the order of 1.6 bar. During the comparison step S2, the command unit 140 selects the suitable chart as a function of the binder spraying conditions and it subsequently transitions to the comparison step S3. In this step, the command unit associates the reference flow value that is equal to the measured flow, in this case 1500 l/h, with several reference values originating from reading the curves Cb1, Cb2, Cb3 relating to the blockages of nozzles.

Thus, for a binder flow that is equal to 1500 l/h, a pressure of 1.6 bar corresponds to a configuration without a blocked nozzle, a pressure of 1.8 bar corresponds to a configuration with two blocked nozzles, and a pressure of 2.2 bar corresponds to a configuration with four blocked nozzles. In the comparison step S3, the command unit compares the measured binder pressure value, which in this first case equals 1.6 bar. This results in the spraying device not having any blockage.

In the second case, during a first measuring step S1, a pair of values V2 is measured with a binder flow of the order of 1500 l/h and a binder pressure of the order of 2 bar. The same chart is selected by the command unit, since the spraying conditions are the same, and the comparison performed by the command unit indicates that the pair of measured values reveals a configuration such that at least two nozzles are blocked and that there are less than four blocked nozzles. The control method can send information to the user to the effect that it appears that three nozzles are blocked.

In the above, the result of the comparison step helps to determine a number of blocked nozzles by considering that the nozzles are completely blocked. It is to be noted that the control device according to the invention also allows information relating to the blockage of the nozzles to be sent to a user when the nozzles are only partially blocked, or even when it is the flow cross-section in the ring of the spraying device that is partially reduced. If such partial blockages are distributed over enough different nozzles, the effect on the pressure of the binder for a given flow can be equivalent to the effect on the pressure of the binder of the complete blockage of some nozzles. The control device according to the invention thus can allow monitoring of the clogging of the equipment to be provided over time and/or allow the evolution of the passage surface to be monitored.

The invention as previously described therefore allows, using simple means, rapid detection of the flow conditions of a bonding composition 200 through spray nozzles 150, with a view to spraying such a bonding composition 200 onto mineral fibers 300 in order to produce a mineral wool.

However, the invention will not be limited to the described and illustrated means and configurations and it is also applicable to all equivalent means or configurations and to any combination of such means. For example, and in a non-limiting manner, it is to be noted that the invention is also applicable irrespective of the fluids of the bonding composition for which the flow and pressure are simultaneously measured by the first measuring apparatus 120 and by the second measuring apparatus 130. Thus, by way of a non-limiting example, the charts used to implement the method according to the invention can be established on the basis of a flow D of the binder 210 and of a pressure P of the spray 220 of the bonding composition 200, in particular since the device comprises an adjustment system able to allow a constant proportion of the spray relative to the binder to be upheld throughout the entire duration of the spraying operation, or, in other words, to allow a constant air/liquid ratio.

Another alternative embodiment can involve, for example, the type of nozzles used in the spraying system and in the bonding composition intended to be sprayed by these nozzles. The control device according to the invention thus could be implemented with nozzles called airless nozzles, i.e. nozzles configured to spray the binder without adding compressed air forming a spray. According to the aforementioned description, the control device involves measuring the flow and the pressure of the binder and comparing the measured values with reference values.

The invention claimed is:

1. A device for controlling a system for spraying a bonding composition onto mineral fibers, the spraying system comprising at least one ring, inside which the mineral fibers are intended to pass, and at least one spray nozzle arranged on the at least one ring and configured to spray the bonding composition onto the mineral fibers,
wherein the device comprises at least one flow sensor configured to measure a flow of a fluid of the sprayed bonding composition and at least one pressure sensor configured to measure a pressure of a fluid of the sprayed bonding composition,
wherein the device comprises a module configured to compare at least one pair formed by a value, measured by the at least one flow sensor, of the fluid flow and a value, measured by the at least one pressure sensor, of the fluid pressure, with at least one pair formed by a first previously defined reference value of a considered fluid flow, and by a second previously defined reference value of the considered fluid pressure, and
wherein the spraying system comprises at least a pump for feeding the fluid which is controlled into the device, so that a value of the flow of the fluid is constant.

2. The control device as claimed in claim 1, comprising a command unit configured to command the at least one flow sensor and the at least one pressure sensor to respectively simultaneously measure a flow of a fluid of the bonding composition and a pressure of a fluid of the bonding composition in real time.

3. The control device as claimed in claim 2, wherein the command unit is configured to generate a first warning signal as soon as a difference between a pair of measured values of fluid flow and pressure and a pair of reference values of fluid flow and pressure exceeds a first predefined warning threshold.

4. The control device as claimed in claim 2, the command unit is configured to generate a second warning signal as soon as a difference between a pair of measured values of fluid flow and pressure and a pair of reference values of fluid flow and pressure exceeds a second predefined warning threshold.

5. The control device as claimed in claim 1, wherein the at least one flow sensor is configured to measure a flow of a binder forming an incompressible fluid of the sprayed bonding composition and wherein the at least one pressure sensor is configured to measure a pressure of said binder.

6. The control device as claimed in claim 1, wherein the sprayed bonding composition comprises a first fluid formed of a binder and a second fluid formed of air, wherein the spraying system comprises a system configured to maintain a constant ratio between the first and second fluids forming the bonding composition and wherein the at least one flow sensor is configured to measure a value of the flow of the binder forming an incompressible fluid of the sprayed bonding composition, whilst the at least one pressure sensor is configured to measure a value of the pressure of the flow, of air forming the second fluid of the bonding composition.

7. A manufacturing installation, comprising a fiber drawing system configured to feed fibers into a station for bonding these fibers, wherein the bonding station comprises a control device as claimed in claim 1.

8. The manufacturing installation as claimed in claim 7, configured to manufacture mineral wool.

9. A method for controlling the spraying quality of a bonding composition sprayed onto mineral fibers, comprising:

- a step of defining a plurality of pairs of reference values, respectively of a flow of a fluid of the bonding composition and of a pressure of a fluid of the bonding composition;
- a step of simultaneously measuring, respectively by at least one flow sensor and by at least one pressure sensor of a control device as claimed in claim 1, a value of a flow of a fluid of the bonding composition and a value of a pressure of a fluid of the bonding composition;
- a step of comparing a pair formed by a measured fluid flow value and a measured fluid pressure value with at least one pair of reference fluid flow and fluid pressure values.

10. The method as claimed in the claim 9, wherein, during the comparison step, a reference value identical to a value measured in the measuring step is identified from among charts consolidating the pairs of reference values and the other value of the pair of reference values is compared to the other value of the pair of measured values, with a warning step being generated in the event of a significant difference between the compared measured value and the compared reference value.

11. The method as claimed in claim 9, comprising a retroaction step, during which an action for treating the state of the ring is manually or automatically implemented following the triggering of a warning signal.

* * * * *